United States Patent [19]
Ward

[11] 3,862,668
[45] Jan. 28, 1975

[54] HYDROSTATIC TRANSMISSION CONTROL SYSTEM

[75] Inventor: Harold R. Ward, Marshall, Mich.

[73] Assignee: Eaton Corporation, Cleveland, Ohio

[22] Filed: June 13, 1973

[21] Appl. No.: 369,468

[52] U.S. Cl.................. 180/6.48, 60/97 E, 60/428
[51] Int. Cl............................................ B62d 11/00
[58] Field of Search............ 180/6.48, 6.7; 60/97 E, 60/420, 429, 428; 74/720.5; 91/375 R; 418/40; 415/13; 303/21 FP

[56] References Cited
UNITED STATES PATENTS

| | | | |
|---|---|---|---|
| 2,738,849 | 3/1956 | Nubling | 180/6.48 |
| 2,859,591 | 11/1958 | Zimmerman | 60/97 E |
| 3,217,822 | 11/1965 | Ross | 180/6.48 |
| 3,247,919 | 4/1966 | Moon, Jr. | 180/6.48 |

Primary Examiner—Trygve M. Blix
Assistant Examiner—Charles E. Frankfort
Attorney, Agent, or Firm—Teagno & Toddy

[57] ABSTRACT

An improved straight tracking control assembly equalizes the output speeds of a pair of hydrostatic transmissions during straight forward movement of a vehicle and enables the hydrostatic transmissions to operate at different speeds during turning of the vehicle. The straight tracking control assembly includes inner and outer valve members. Each of the valve members is rotated by an input shaft at a speed which varies as a function of variations in the output speed of an associated one of the hydrostatic transmissions. As long as the two valve members are rotated at the same speed, the valve members cooperate to block fluid flow from the straight tracking control assembly to actuator assemblies which are operable to vary the output speeds of the hydrostatic transmissions. If one of the hydrostatic transmissions should be accelerated relative to the other hydrostatic transmission, relative rotation occurs between the inner and outer valve members. This results in the porting of fluid under pressure to one of the actuator assemblies to decrease the output speed of the accelerating hydrostatic transmission. Excessive relative rotation between the inner and outer valve members is prevented by a stop pin which is moved into abutting engagement with a stop surface when the valve members have been rotated through a predetermined distance relative to each other. When this occurs, a clutch assembly between one of the valve members and its input shaft begins to slip and the valve members rotate together.

30 Claims, 8 Drawing Figures

PATENTED JAN 28 1975

HYDROSTATIC TRANSMISSION CONTROL SYSTEM

BACKGROUND OF THE INVENTION

This invention relates to a straight tracking control assembly for equalizing the output speeds of a pair of hydrostatic transmissions.

There are many different types of straight tracking control assemblies for equalizing the output speeds of a pair of hydrostatic transmissions. One of these known control assemblies is disclosed in U.S. Pat. No. 3,217,822 and includes a summing differential which is driven by the output of a pair of hydrostatic transmissions and is utilized to drive a pump. When one of the hydrostatic transmissions is operated at a higher speed than the other, the fluid output from the pump actuates a balancing valve to port fluid to a pair of actuator assemblies which adjust the output speeds of the two hydrostatic transmissions. Other straight tracking control arrangements are shown in U.S. Pat. Nos. 3,355,866; 3,085,403; and 3,247,919.

In the press art, a field which is unrelated to the controlling of movement of a vehicle, synchronizing devices have been utilized to equalize the fluid outputs of a pair of pumps to maintain the slide or platen plate of a press level. For example, U.S. Pat. No. 2,859,591 discloses a synchronizer for maintaining the slide of a press level.

SUMMARY OF THE PRESENT INVENTION

The present invention provides a new and improved apparatus which is utilized to effect operation of a pair of hydrostatic transmissions at the same speed during straight forward movement of a vehicle and which enables the hydrostatic transmissions to be operated at different speeds during turning of the vehicle. This apparatus includes a straight tracking valve assembly having a pair of valve members which are driven by input shafts connected with associated hydrostatic transmissions. Each of the input shafts rotates the associated valve member at a speed which varies as a function of variations in the output speed of the associated hydrostatic transmission. As long as the two hydrostatic transmissions have the same output speed, the two valve members are rotated at the same speed. However, if one of the transmissions should accelerate relative to the other transmission, rotation occurs between the two valve members and fluid is ported to effect a variation in the output speed of at least one hydrostatic transmission.

To prevent excessive relative rotation from occurring between the two valve members, after the valve members have been rotated through a predetermined distance relative to each other, the valve members are interconnected so that they will rotate together. Since one of the input shafts to the interconnected valve members will then be rotating faster than the other input shaft, slipping occurs to a clutch assembly located between one of the input shafts and one of the valve members. During turning of the vehicle, actuation of a steering valve exceeds the correction ability of the straight tracking control assembly to equalize the output speeds of the two hydrostatic transmissions. This enables one of the tracks of the vehicle to be driven at a higher speed than the other track to turn the vehicle.

Accordingly, it is an object of this invention to provide a new and improved apparatus for equalizing the speed at which a pair of tracks of a vehicle are driven by a pair of hydrostatic transmissions and wherein the apparatus includes a pair of valve members which are driven at speeds which vary as a function of variations in the output speeds of the hydrostatic transmissions and an assembly for varying the speed at which the hydrostatic transmissions drive at least one of the tracks in response to movement of one of the valve members relative to the other valve member.

Another object of this invention is to provide a new and improved apparatus for controlling the operation of an actuator assembly to vary the output speed of at least an associated one of a pair of hydrostatic transmissions and wherein this apparatus includes a first valve member which is rotated at a speed which varies as a function of variations in the operating speed of an associated hydrostatic transmission, a second valve member which is rotated at a speed which varies as a function of variations in the operating speed of the other hydrostatic transmission, and a clutch which enables the valve members to rotate together during continued operation of the hydrostatic transmissions at different speeds.

Another object of this invention is to provide a new and improved apparatus for controlling the operation of an actuator assembly to vary the output speed of at least an associated one of a pair of hydrostatic transmissions and wherein the apparatus includes a first valve member which is rotated at a speed which varies as a function of variations in the operating speed of an associated one of the pair of hydrostatic transmissions, a second valve member which is rotated at a speed which varies as a function of variations in the operating speed of the other one of a pair of hydrostatic transmissions, and a stop arrangement to limit the extent of relative rotation between the valve members.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
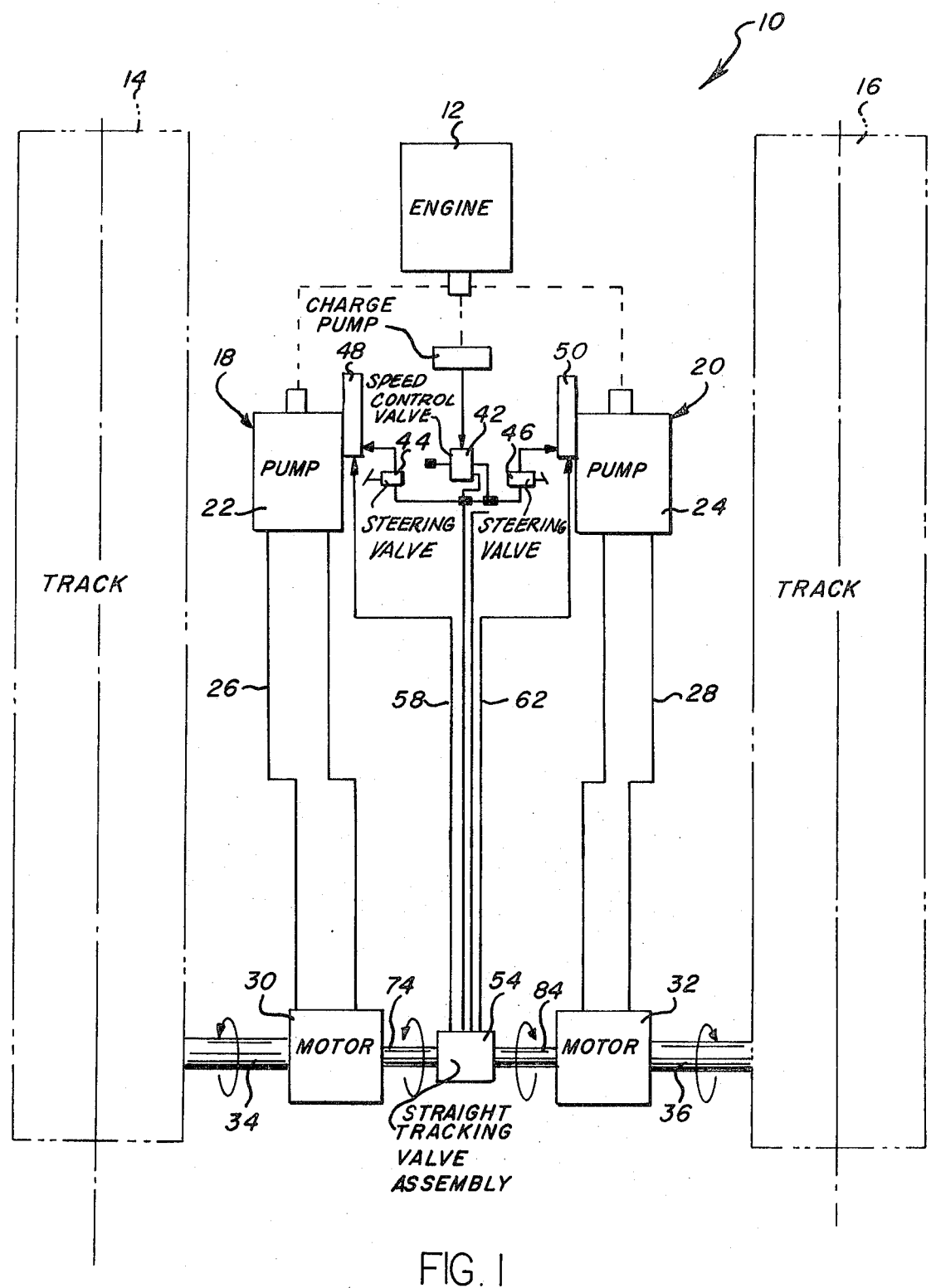
FIG. 1 is a schematic illustration of a vehicle having a pair of tracks which are driven by hydrostatic transmissions.

A vehicle 10 (FIG. 1) has an engine 12 which drives left and right hand tracks 14 and 16 through left and right hand hand hydrostatic transmissions 18 and 20. The hydrostatic transmissions 18 and 20 include variable displacement pump units 22 and 24 which are driven by the engine 12 and transmit fluid under pressure through hydraulic circuits 26 and 28 to motor units 30 and 32. The motor units 30 and 32 are connected with the tracks 14 and 16 by output shafts 34 and 36.

When the vehicle 10 is being driven along a straight path, the input to output speed ratios of the hydrostatic transmissions 16 and 18 are simultaneously changed by equal amounts upon operation of a speed control or pressure regulator valve 42 which is connected with the hydrostatic transmissions through steering control valves 44 and 46. Assuming that the vehicle is moving forward along a straight path, the speed control valve 42 can be operated to increase the control fluid pressure transmitted through the steering valves 44 and 46 to pressure responsive pump actuator assemblies 48 and 50. This causes the actuator assemblies 48 and 50 to increase the effective displacement of the pump units 18 and 20 by equal amounts to thereby increase the speed at which the tracks 14 and 16 are driven by the motors 30 and 32. If it is desired to turn the vehicle, one of the steering control valves 44 or 46 is actuated to reduce the output speed of the associated one of the hydrostatic transmissions 18 or 20 connected with the track 14 or 16 on the side toward which the vehicle is to turn. The general construction of the speed control valve 42, steering control valves 44 and 46, actuator assemblies 48 and 50, and the pump units 22 and 24 is similar to that disclosed in U.S. Pat. application Ser. No. 248,685 filed on Apr. 28, 1972 by Edward J. Bojas and Harold R. Ward and entitled Hydrostatic Transmission Drive System.

In accordance with the present invention, when the vehicle 10 is being driven along a straight path a straight tracking control or valve assembly 54 equalizes the output speeds of the two motor units 30 and 32. If the left hand motor unit 30 and track 14 should tend to accelerate relative to the right hand motor unit 32 and track 16, the straight tracking valve assembly 54 ports fluid under pressure through a conduit 58 (FIG. 2) to operate the left hand actuator assembly 48 and reduce the effective displacement of the pump unit 22 to thereby reduce the output speed of the motor unit 30 and the speed of the left track 14. Similarly, if the right hand track 16 of the vehicle 10 should tend to accelerate relative to the left hand track 14, the straight tracking valve assembly 54 ports fluid under pressure to a conduit 62 (FIG. 2) to effect operation of the right hand actuator assembly 50 to reduce the effective displacement of the right hand pump unit 24 and the speed at which the right hand track is driven by the motor unit 32. When the two tracks 14 and 16 are being driven at the same speed, the straight tracking valve assembly 54 is ineffective and the displacement of the pump units 22 and 24 is regulated by operating the speed control valve 42 which may be of the pressure regulator type disclosed in the U.S. Pat. No. 3,540,220.

Figure 3:
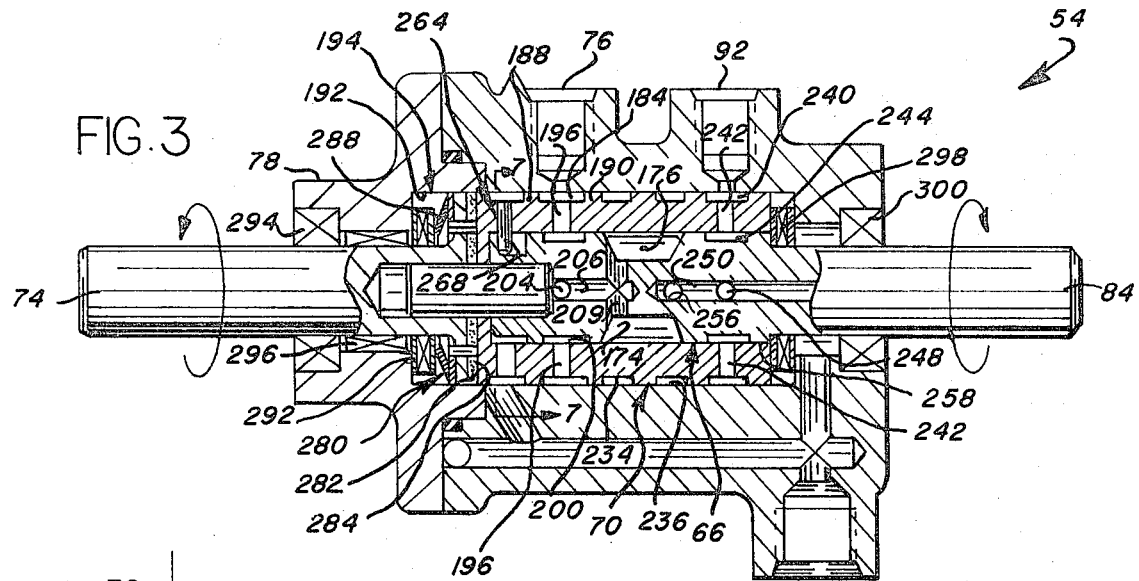
FIG. 3 is a sectional view, taken along line 3—3 of FIG. 2, further illustrating the construction of the straight tracking control assembly.

The straight tracking valve assembly 54 includes an inner valve member 66 (see FIG. 3) which cooperates with an outer valve member 70 to port fluid under pressure to one of the actuator assemblies 48 or 50 upon relative rotation between the valve members. The inner valve member 66 is rotated at a speed which varies as a function of variations in the speed at which the right hand track 16 is driven by the motor unit 32. The outer valve member 70 is disposed in a telescopic relationship with the inner valve member 66 and is rotated at a speed which varies as a function of variations in the speed at which the left hand track is driven by the motor unit 30.

Figure 4:
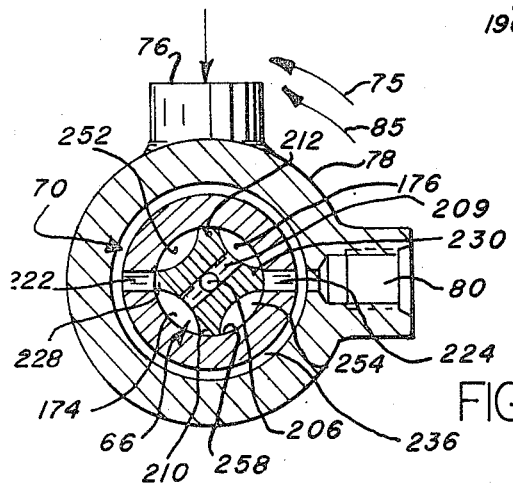
FIG. 4 is a sectional view, taken generally along line 4—4 of FIG. 2, illustrating the relationship of inner and outer straight tracking valves relative to an outlet through which fluid is conducted to one of the actuator assemblies of FIG. 2.

If the output speed of the left hand motor unit 30 exceeds the output speed of the right hand motor unit 32 during forward movement of the vehicle 10, a left hand input shaft 74 from the motor unit 30 rotates the outer valve member 70 (in the direction of the arrow 75 of FIG. 4) at a higher speed than the inner valve member 66. The resulting relative rotation between the valve members 66 and 70 causes the straight tracking valve assembly 54 to port high pressure fluid from an inlet 76 in a valve housing 78 to an outlet 80 (see FIG. 4) connected to the conduit 58. This fluid pressure effects operation of the left hand actuator assembly 48 to reduce the effective displacement of the left pump 22 and the output speed of the left hand motor 30.

Similarly, if the output speed of the right hand motor unit 32 exceeds the output speed of the left hand motor unit 30 during forward movement of the vehicle 10, a right hand input shaft 84 from the motor unit 32 rotates the inner valve member 66 (in the direction of the arrow 85 in FIG. 4) at a higher speed than the outer valve member 70. The resulting relative rotation between the valve members 66 and 70 causes the straight tracking valve assembly 54 to port high pressure fluid from the inlet 76 to an outlet 88 (see FIG. 5) connected to the conduit 62. This fluid pressure effects operation of the right hand actuator assembly 50 to reduce the effective displacement of the right pump unit 24 and output speed of the right hand motor unit 32.

The straight tracking valve assembly 54 is effective to maintain the vehicle on a straight path during reverse or backward movement of the vehicle 10. Thus, when the vehicle 10 is moving backward and the speed of the left hand track 14 exceeds the speed of the right hand track 16, the outer valve member 70 is rotated (in a direction opposite to the arrow 75) at a higher speed than the inner valve member 66. This results in the porting of high pressure fluid from an inlet 92 (see FIGS. 3 and 50 to the outlet 80 (see FIG. 4) connected to the conduit 58 (see FIG. 2) leading to the left hand actuator assembly 48. Similarly, when the vehicle 10 is moving backward and the speed of the right hand track 16 exceeds the speed of the left hand track 14, the inner valve member 66 is rotated (in a direction opposite to the arrow 85) at a higher speed than the outer valve member 70. This results in the porting of high pressure fluid from the inlet 92 to the outlet 88 (FIG. 5) connected to the conduit 62 (FIG. 2) leading to the right hand actuator assembly 50. Thus, the straight tracking valve assembly 54 is effective to maintain the vehicle 10 on a straight path during either forward or reverse movement of the vehicle.

Figure 2:
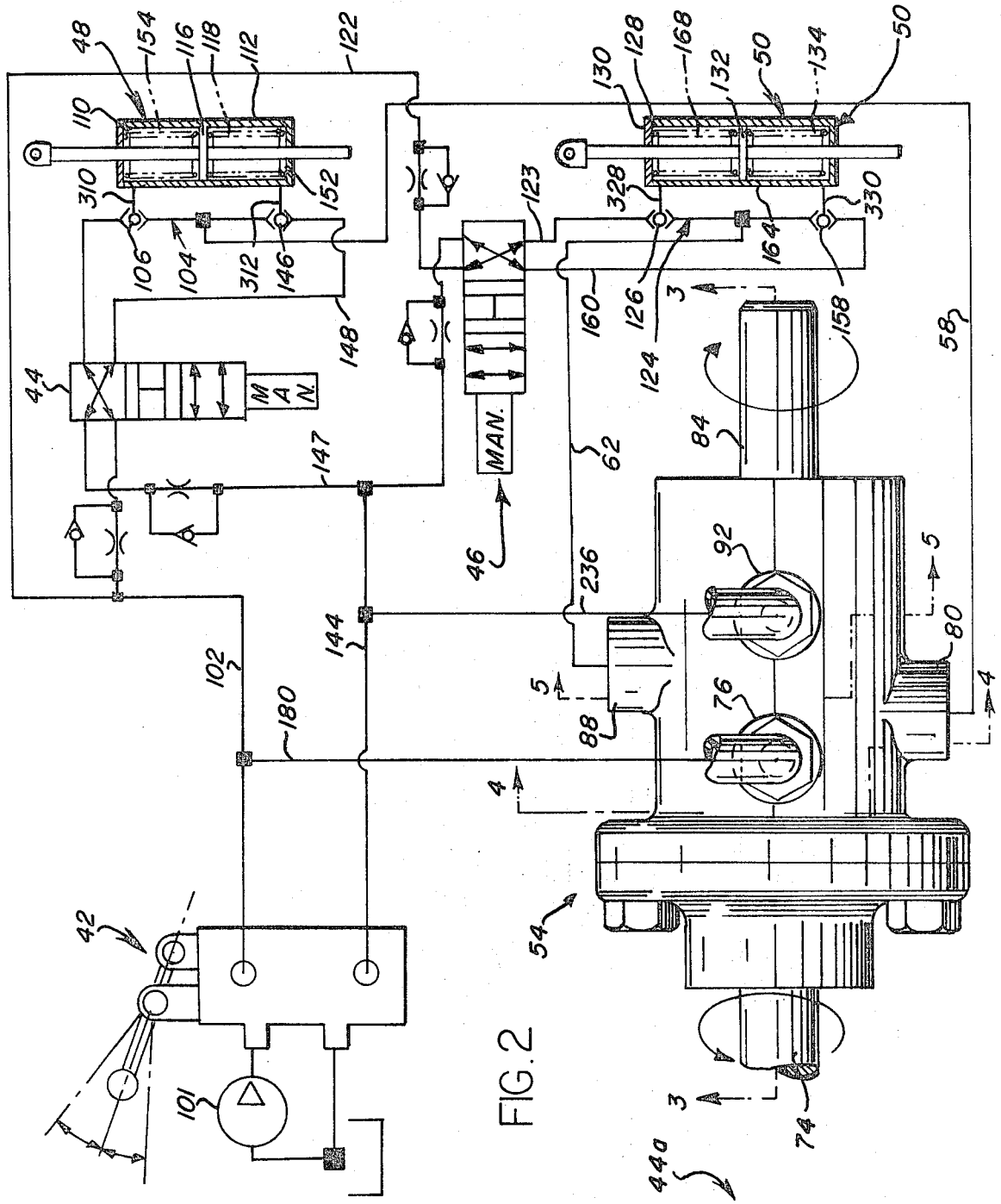
FIG. 2 is a schematic illustration depicting the relationship between a straight tracking control assembly, steering control valves, and a pair of actuator assemblies for varying the output speeds of the hydrostatic transmissions of FIG. 1.

The straight forward speed of the vehicle 10 is varied by actuating the speed control valve 42 (FIG. 2). The speed control valve 42 ports fluid under pressure from a charge pump 101 to a conduit 102 which is connected, through the steering control valve 44, to a rectifying valve arrangement 104 for the left hand actuator assembly 48. The rectifying valve arrangement 104 includes a check valve 106 which enables high pressure fluid to enter the forward end portion 110 of a double acting fluid motor 112. This high pressure fluid moves a piston 116 against the influence of a biasing spring 118 to vary the effective displacement of the left pump unit 22 to an extent which varies as a function of variations in the pressure of the conduit 102.

During straight forward operation of the vehicle 10, the speed control valve 42 also controls the operations of the actuator assembly 50 for the right hand pump unit 24. Accordingly, high pressure fluid is conducted from the conduit 102 through a conduit 122 (FIG. 2) leading to the steering control valve 46. The unactuated steering control valve 46 ports high pressure fluid to a conduit 123 leading to a rectifying valve arrangement 124 for the right hand actuator assembly 50. The rectifying valve arrangement 124 includes a check valve 126 which ports the high pressure fluid from the conduit 123 into the forward end portion 128 of a double acting fluid motor 130. This fluid pressure moves a piston 132 against the influence of a biasing spring 132 to increase the effective displacement of the right hand pump unit 24 with variations in the control fluid pressure in the conduit 102. The left and right hand actuator assemblies 48 and 50 are constructed so that they vary the displacements of the pump units 22 and 24 to the same extent in response to a change in pressure in the conduit 102.

During straight backward movement of the vehicle 10, the speed control valve 42 ports high pressure fluid from the charge pump 101 to a conduit 144. The conduit 144 is connected, through the steering control valve 44, with a check valve 146 in the rectifying valve arrangement 104 for the left hand actuator assembly 48 by conduit 147 and 148. The high pressure fluid passes through the check valve 146 into a rearward or reverse end portion 152 of the double acting motor 112 and moves the piston 116 against the influence of a biasing spring 153 to vary the effective displacement of the pump 22 as a function of variations of the fluid pressure conducted from the speed control valve 42 to the conduit 144.

The conduit 144 is also connected, through the steering control valve 46, with a check valve 158 in the rectifying valve arrangement 124 for the right hand of actuator assembly 50 by a conduit 160. The high pressure fluid passes through the check valve 158 into a reverse or backward end portion 164 of the double acting fluid motor 130 to cause the piston 132 to move against the influence of a biasing spring 168 to vary the effective displacement of the pump unit 24 as a function of variations in the fluid pressure in the conduit 144.

To prevent a hydraulic locking up of the motors 112 and 130, the reverse end portions 152 and 164 of the fluid motors are connected with drain through speed control valve 42 and the conduits 144, 148 and 160 during forward operation of the hydrostatic transmissions 18 and 20. Similarly, the forward end portions 110 and 128 of the fluid motors 112 and 130 are connected with drain through the speed control valve 42 and the conduits 102 and 122 during reverse operation of the hydrostatic transmissions 18 and 20. Although this drain connection could be made in many different ways, it is perhaps best accomplished by operation of the speed control valve 42.

The straight tracking valve assembly 54 ports fluid under pressure to one of the actuator assemblies 48 or 50 to compensate for an increase in the output speed of the associated hydrostatic transmission relative to the other hydrostatic transmission. The inner valve member 66 cooperates with the outer valve member 70 to define a pair of longitudinally extending pressure chambers 174 and 176 (see FIGS. 3, 4 and 5) which hold fluid under pressure during forward operation of the hydrostatic transmissions 18 and 20. The chambers 174 and 176 are connected with the high pressure conduit 102 by a conduit 180 (FIG. 2) which is in turn connected with the inlet 76. The inlet 76 is connected directly to an annular chamber 184 (FIG. 3) formed by a cooperation between annular valve lands 188 and 190 and a cylindrical surface 192 of a valve chamber 194 formed in the housing 78.

The annular groove 184 is connected in fluid communication with the inner valve member 66 through radial passages 196 so that high pressure fluid can flow from the inlet 76 to a second annular groove 200 formed between annular lands on the inner valve member 66. Fluid flows from the annular groove 200 through a radial passage 204 to an axial passage 206 which is connected in fluid communication with the chambers 174 and 176 (see FIG. 4) by a second radial passage 209. Thus, during forward operation of the hydrostatic transmissions 18 and 20 fluid pressure flows from the conduit 102 through the inlet 76 to the longitudinally extending pressure chambers 174 and 176. It should be noted that the pressure chambers 174 and 176 extend lengthwise or axially along the inner valve member 66 from a position adjacent the outlet 80 (see FIGS. 2 and 4) to a position adjacent to the outlet 88 (see FIGS. 2 and 5).

If one of the tracks 14 or 16 (see FIG. 1) should encounter a relatively slippery condition or a condition of relatively high resistance to movement during straight forward movement in the vehicle 10, the output speeds of the two motor units 30 and 32 will vary somewhat relative to each other. Since the input shafts 74 and 84 are rotated at speeds which are directly proportional to the output speeds of the associated motor units, the input shafts 74 and 84 will rotate the inner and outer valve members 66 and 70 at different speeds. Upon relative rotation between the inner and outer valve members, high pressure fluid from the chambers 174 and 176 (see FIGS. 4 and 5) is conducted to the actuator assembly 48 and 50 associated with the pump unit 22 or 24 of the hydrostatic transmission having the greater output speed. This fluid pressure operates the actuator assembly 48 or 50 to reduce the output speed of the accelerating hydrostatic transmission until the two transmissions are again operating at the same speed.

Figure 5:
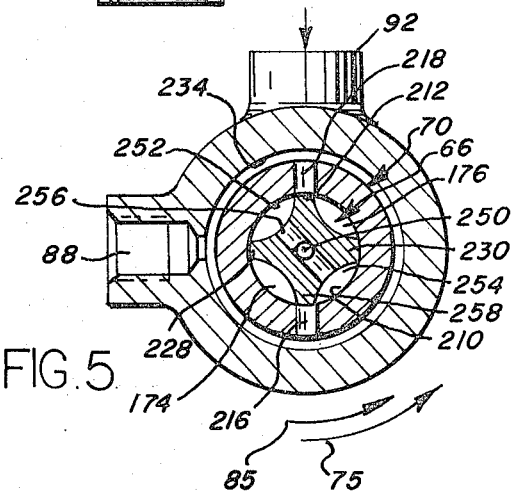
FIG. 5 is a sectional view, taken generally along line 5—5 of FIG. 2, illustrating the relationship of inner and outer straight tracking valves to an outlet through which fluid is conducted to another one of the actuator assemblies of FIG. 2.

For example, if the track 16 should encounter a relatively slippery condition during straight forward movement of the vehicle 10, the motor unit 32 will accelerate relative to the motor unit 30. Immediately prior to slipping or acceleration of the track 16 relative to the track 14, the inner valve member 66 is in the position shown in FIG. 5 with lands 210 and 212 blocking fluid flow from the pressure chambers 174 and 176 to radial passages 216 and 218 formed in the outer valve member 70 (FIG. 5). As the track 16 begins to slip or accelerate relative to the track 14, the speed of rotation of the input shaft 84 increases relative to the speed of rotation of the input shaft 74. This causes the inner valve member 66 to begin to rotate in a counterclockwise direction (as viewed in FIG. 5) relative to the outer valve member 70. This relative rotation moves the land 210 and 212 away from the passages 216 and 218 so that fluid can flow from the pressure chambers 174 and 176 to the outlet 88 (see FIG. 6).

The fluid pressure in the conduit 62 is utilized to decrease the speed at which the accelerating track 16 is driven by the motor unit 32. Thus, the fluid pressure is conducted by the conduit 62 from the outlet 88 to the rectifying valve arrangement 124 for the actuator assembly 50. Since the check valve 126 is biased downwardly (as viewed in FIG. 2) by the relatively high fluid pressure in conduit 123 during forward movement of the vehicle 10, the fluid pressure in the conduit 62 passes through the check valve 158 into the reverse end portion 164 of the fluid motor 130. This fluid pressure acts on the piston 132 to move it upwardly (as viewed in FIG. 2) against the influence of the spring 168 and the fluid pressure in the chamber 128.

As the piston 132 is moved under the influence of the increasing pressure in the reverse end portion 164 of the fluid motor 130, the effective displacement of the right pump unit 24 is reduced until the motor unit 32 drives the right hand track 16 of the vehicle 10 at the same speed as the track 14. Still further movement of the piston 132 causes the forward speed of the motor unit 32 to fall below the forward speed of the motor unit 30 so that the outer valve member 70 is rotated by the input shaft 74 at a higher speed than the speed at which the inner valve member 66 is rotated by the input shaft 84. This results in the outer valve member 70 being rotated in a counterclockwise direction (as viewed in FIG. 6) relative to the inner valve member 66 until the lands 210 and 212 are again in a blocking relationship with the passages 216 and 218 (see FIG. 5).

Since the motor unit 30 is now operating at a greater speed than the motor unit 32, the input shaft 74 will rotate the outer drive member at a greater speed than the inner valve member 66. This causes the outer valve member 70 to rotate in a counterclockwise direction (as viewed in FIG. 4) relative to the inner valve member 66. This relative rotation between the inner and outer valve members 66 and 70 moves the passages 222 and 224 in a counterclockwise direction from the position shown in FIG. 4 so that they are no longer blocked by lands 228 and 230 formed on the inner valve member 66. When this occurs, high pressure fluid flows from the pressure chambers 174 and 176 to the output 80 which is connected by the conduit 58 (see FIG. 2) to the rectifying valve arrangement 104 for the left hand actuator assembly 48. Since the check valve 106 is actuated by the fluid pressure from the conduit 102, the fluid pressure from the conduit 58 flows through the check valve 146 to the reverse chamber portion 152 of the motor 112. This causes the actuator assembly 48 to decrease the output speed of the hydrostatic transmission 18 in the manner previously explained in connection with the actuator assembly 50 and the hydrostatic transmission 20.

The actuator assembly 48 is operated to reduce displacement of the pump unit 22 until the left hand motor 30 has a speed which is slightly less than the forward speed of the motor unit 32. This results in the inner valve member 66 being rotated in a counterclockwise direction relative to the outer valve member 70 so that the lands 228 and 230 again block the flow through the passages 222 and 224. When this occurs, the motor unit 32 will have a slightly greater output speed than the motor unit 30. The difference in speeds between the two motor units 30 and 32 will now be relatively small so that after a minimum of hunting, the output speeds of the two motor units 30 and 32 equalize with the inner and outer valve members in the position shown in FIGS. 4 and 5. It should be noted that the outlet 80 is connected in fluid communication with an annular groove 234 formed between annular lands on the outer valve member 70 and that the outlet 88 is connected in fluid communication with an annular 236 formed between lands on the outer valve member. The lands on the outer valve member 70 block fluid communication between the two annular grooves 234 and 236 and the two outlet ports 80 and 88 during operation of the straight tracking valve assembly 54.

If during straight forward operation of the vehicle 10, the left hand track 14 should accelerate relative to the right hand track 16, the straight tracking valve assembly 54 will function in much the same manner as previously explained in connection with acceleration of the right hand track. However, acceleration of the left hand track 14 causes the outer valve member 70 to rotate in a counterclockwise direction (as viewed in FIG. 40 relative to the inner valve member so that high pressure fluid is conducted from the pressure chambers 174 and 176 to the outlet 80 which is connected with the left hand actuator assembly 48 by the conduit 58 (FIG. 2). The high pressure in the conduit 58 is conducted through the check valve 146 to the rearward or reverse end portion 152 of the double action motor 112 to move the piston 116 upwardly (as viewed in FIG. 2) to reduce the effective displacement of the pump unit 22 and the forward speed of the motor unit 30.

During reverse movement of the vehicle 10 high pressure fluid is conducted from the speed control valve 42 to the conduit 114 (FIG. 2) which is connected with the reverse end portions 152 and 164 of the right and left hand actuator assemblies 48 and 50. The high pressure fluid flows from the conduit 144 through the steering control valves 44 and 46, conduits 148 and 160, and rectifying valve arrangements 104 and 124 to the reverse end portions 152 and 162 of the fluid motors 112 and 130 in the manner previously explained. In addition, the high pressure fluid is conducted by the conduit 236 to the inlet 92 to the straight tracking valve assembly 54. The relatively high pressure fluid from the inlet 92 enters an annular groove 240 (see FIG. 3) formed between adjacent annular lands on the outer valve member 70 and the cylindrical wall 192 of the valve chamber 194. The fluid flows from the annular groove 240 through radially extending passages 242 into an annular groove 244 formed between annular lands on the inner valve member 66. The high pressure fluid flows through a pair of radially extending passages 248 to a passage 250 which is connected with pressure chambers 252 and 254 (see FIG. 5) by a passage 256 in much the same manner in which the passage 206 is connected with the pressure chambers 174 and 176.

The pressure chambers 252 and 254 extend longitudinally along the inner valve member 66 between the outlets 80 and 88 in much the same manner in which the pressure chambers 174 and 176 extend along the inner valve member between these two outlets. However, it should be noted that the lands 210, 212, 228 and 230 on the inner valve member 66 cooperate with a cylindrical inner surface 258 (see FIGS. 4 and 5) of the outer valve member 70 to block fluid communication between the pressure chambers 174 and 176 and the pressure chambers 252 and 254.

If one of the tracks 14 or 16 should tend to accelerate relative to the other track during straight backward movement of the vehicle 10, relative rotation will occur between the inner and outer valve members 66 and 70 to port fluid to the outlet 80 and 88 and thereby tend to equalize the output speeds of the two hydrostatic transmissions 18 and 20. Thus, if the left track 14 should accelerate relative to the right track 16 during reverse movement of the vehicle 10, the outer valve member 70 is moved in a clockwise direction from the position shown in FIG. 4 to enable fluid to flow from the pressure chamber 254 through the passage 224 to the outlet 80. In addition, fluid will flow to the outlet 80 from the pressure chamber 252 through the passage 222.

The flow of the high pressure fluid is then conducted by the conduit 58 (see FIG. 2) to the rectifying valve arrangement 104. Since the check valve 146 will have been previously operated by the relatively high pressure fluid in the conduit 148 the fluid will flow from the conduit 58 through the check valve 106 into the forward end portion 110 of the fluid motor 112. Of course, increasing the pressure in the forward end portion 110 of the motor 112 causes the piston 116 to move downwardly (as viewed in FIG. 2) against the influence of the spring 118 and the fluid pressure in the rearward end portion 152 of the motor 112. This movement of the piston 116 decreases the effective displacement of the left pump unit 22 and the output speed of the left motor unit 30. After a slight hunting or oscillating action similar to that previously described in connection with forward operation of the straight tracking valve assembly 54, the output speeds of the two motor units 30 and 32 are equalized and the vehicle will process backward along a straight path.

Similarly, if the right hand track 16 should accelerate relative to the left hand track 14 during reverse movement of the vehicle 10, the inner valve member 66 will rotate in a clockwise direction (as viewed in FIG. 5) relative to the outer valve member 70 to port fluid from the pressure chambers 252 and 254 through the passages 216 and 218 to the outlet 88. This high pressure fluid from the outlet 88 is connected by the conduit 62 to the rectifying valve arrangement 124. Since the check valve 158 will have been actuated by the relatively high fluid pressure in the conduit 160, the fluid pressure in the conduit 162 is transmitted through the check valve 126 to the forward end portion 128 of the motor 130. This fluid pressure causes the piston 132 to move against the influence of the spring 134 to thereby reduce the output speed of the hydrostatic transmission 20 in the reverse direction.

During operation of the vehicle 10 in the forward direction, the speed control valve 42 connects the conduit 144 with drain. Therefore, the conduit 236 connects the inlet 92 and pressure chambers 252 and 254 with drain during forward operation of the vehicle 10. Similarly, the speed control valve connects the conduit 102 with drain during backward movement of the vehicle 10. Therefore the conduit 180 connects the inlet 76 and pressure chambers 174 and 176 with drain during reverse operation of the vehicle 10.

Figure 7:
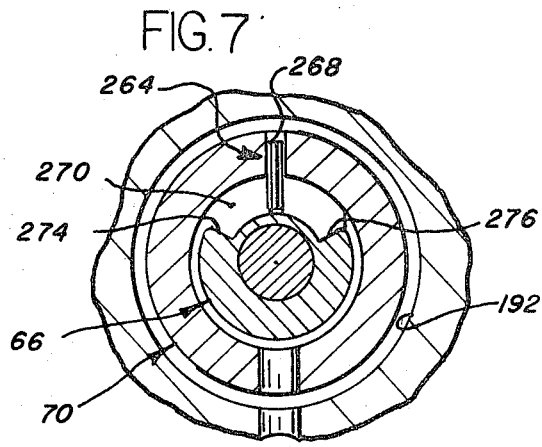
FIG. 7 is a sectional view, taken generally along line 7—7 of FIG. 3, illustrating a stop assembly for limiting relative movement between the inner and outer straight tracking valves.

During a prolonged acceleration of one of the tracks 14 or 16 relative to the other track, one of the motor units 30 or 32 is operated at a higher speed than the other motor unit for a substantial period of time. If relative rotation was allowed to occur between the inner and outer valve members 66 and 70 during this relatively long period of time, the valve members rotate relative to each other to such an extent that the pressure chambers 174, 176, 252 and 254 would no longer cooperate with the passages 216, 218, 222 and 224 in the manner previously explained. To prevent this from occurring, a stop arrangement 264 (see FIG. 7) is provided to limit relative rotation between the inner and outer valve members 66 and 70. The stop arrangement 264 includes pin 268 which is fixedly connected to the outer valve member 70 and extends into an arcuate groove 270 formed in the outer valve member 66. The groove 270 has a pair of opposite stop or end surfaces 274 and 276 which are engaged by the pin 268 to limit relative rotation between the inner and outer valve members 66 and 70.

Figure 6:
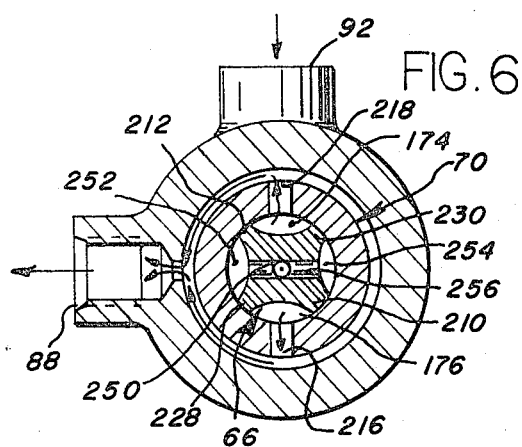
FIG. 6 is a sectional view, generally similar to FIG. 5, illustrating the relationship of the inner and outer straight tracking valves when the hydrostatic transmissions have different output speeds.

Upon relative rotation between the inner and outer valve members 66 and 70 from the position shown in FIG. 5 to the position shown in FIG. 6, the pin 268 and stop surface 276 are brought into abutting engagement with each other to stop further relative rotation between the inner and outer valve members. Similarly, upon relative rotation between the inner and outer valve members 66 and 70 in the opposite direction, the pin 268 moves into abutting engagement with the stop surface 274 to stop further relative rotation between the inner and outer valve members 66 and 70. Thus, once the pin 268 has engaged one of the stop surfaces 274 or 276, the two valve members 66 and 70 rotate at the same speed.

Although the pin 268 moves into abutting engagement with one of the stop surfaces 274 or 276 to limit relative rotation between the inner and outer valve members 66 and 70, the input shafts 74 and 84 may continue to rotate relative to each other due to a continued difference in the output speeds of the two hydrostatic transmissions 18 and 20. Therefore, it is necessary to enable the two input shafts 74 and 84 (see FIG. 3) to rotate relative to each other even though relative rotation between the inner and outer valve members 66 and 70 is prevented by engagement of the stop pin 268 with one of the stop surfaces 274 or 276.

A clutch assembly 280 (see FIG. 3) is provided between the input shaft 74 and the outer valve member 70 to enable relative rotation to occur between the two input shafts 74 and 84 after the stop pin 268 is moved into engagement with one of the stop surfaces 274 or 276. Thus, upon engagement of the stop pin 268 with the stop surface 276 due to rotation of the input shaft 84 at a greater speed than the input shaft 74, the inner and outer valve members 66 and 70 are rotated together relative to the shaft 74 and slipping occurs in the clutch assembly 280. Similarly, if the pin 268 was moved into engagement with the stop surface 274 by rotation of the input shaft at a greater speed than the input shaft 84, the inner and outer valve members 66 and 70 would rotate together at a relatively low speed while the input shaft 74 continues to rotate at a high speed and slipping occurred at the clutch assembly 280. Since the input shafts 74 and 84 are rotated at speeds which are directly proportional to the output speeds of the motor units 30 and 32, the clutch assembly 280 enables the valve members 66 and 70 to move together during prolonged overspeeding of one of the tracks 14 or 16.

The clutch assembly 280 includes a friction disc 282 (FIG. 3) which is fixedly connected with the input shaft 74. The frection disc 282 is pressed against an annular friction surface 284 formed on the end of the inner valve member 70 by a resilient member 288. An axial bearing arrangement 292 supports the resilient member 288 for rotation with the end input shaft 74 relative to the stationary housing 78. It should be noted that additional bearing arrangements 296 and 298 are provided to support the input shafts 74 and 84 and inner and outer valve members 66 and 70.

During turning of the vehicle 10 it is necessary to have one of the tracks 14 or 16 driven at a slower speed than the other track. Thus, upon turning of the vehicle toward the left (as viewed in FIG. 1) the speed of the left hand track 14 is reduced relative to the speed of the right hand track 16. Similarly, the turning of the vehicle to the right, the speed of the right track 16 must be reduced relatively to the speed of the left hand track 14.

During turning of the vehicle 100, actuation of a steering control valve 44 or 46 exceeds the correction ability of the straight tracking valve assembly 54 to equalize the output speeds of the two motor units 30 and 32. Thus, upon operation of either the left hand steering control valve 44 or right hand steering control valve 46, fluid pressure in the conduits 58 and 62 leading from the straight tracking valve assembly 54 to the left and right hand actuator assemblies 48 and 50 is limited to a value less than the steering valve pressure to thereby render the straight tracking valve assembly ineffective.

The manner in which the steering control valves 44 and 46 effect operation of the actuator assemblies 48 and 50 to turn the vehicle 10 is somewhat similar to that disclosed in U.S. Pat. application Ser. No. 158,455, filed June 3, 1971, by Errol W. Keith, Jack Watson, and Edward J. Bojas and entitled "Hydrostatic Transmission Speed and Control System now U.S. Letters Pat. No. 3,727,4002. " The left steering control valve 44 is constructed in the manner shown schematically in FIG. 2 and is connected with the conduits 102, 147, 148, and 308. When the left steering control valve 44 is in its normal or unactuated position (shown schematically in FIG. 2), the steering control valve connects the conduit 102 in fluid communication with the conduit 308 and connects the conduit 147 in fluid communication with the conduit 148. However, upon actuation of the left steering control valve 44 to an intermediate position, the conduits 102, 147, 148, and 308 are interconnected by internal passages in the valve 44 to thereby connect the forward end portion 110 of the fluid motor 112 with the reverse end portion 152 of the motor. Upon operation of the steering control valve 44 to a fully actuated condition, the conduit 102 is connected in fluid communication with the conduit 148 and the conduit 147 is connected in fluid communication with the conduit 308.

During forward operation of the vehicle 10, actuating the steering control valve 44 to the fully actuated position ports high pressure fluid from the conduit 102 to the left reverse end portion 152 of the motor 112. In addition actuating the left steering control valve 44 connects the forward end portion 110 of the motor 112 with drain through conduits 147 and 144. This effects operation of the motor 112 to reduce the output speed of the left hydrostatic transmission 18 and a turning of the vehicle toward the left in the manner fully described in the aforementioned Keith et al. application Ser. No. 158,455 now U.S. Pat. No. 3,727,402.

During actuation of the left steering control valve 44 and a turning of the vehicle 10 toward the left, the input shaft 84 rotates the inner valve member 66 relative to the outer valve member 70 until the stop pin 268 and surface 276 are in abutting engagement. After this occurs, the clutch 280 slips and the inner and outer valve members 66 and 70 are rotated together by the shaft 84 in the manner previously explained.

Figure 8:
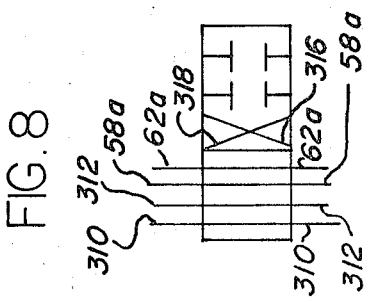
FIG. 8 is a schematic illustration of a second embodiment of steering control valves of FIG. 2.

Although only the left steering control valve 44 has been shown in FIG. 8, it should be understood that the right steering control 46 is constructed in the same manner. Thus, the right steering control valve 46 has intrnal passages which cross connect or interconnect conduits 122, 123, 147, and 160 (FIG. 2) in the same manner as in which the conduits 102, 147, 148, and 308 are cross connected or interconnected by operation of the left steering control valve 44.

In the embodiment of the invention illustrated in FIG. 8 actuation of a steering control valve blocks the fluid output from the straight tracking valve assembly. Since the steering control valves of the embodiment of FIG. 8 are generally similar to the steering control valves 44 and 46, similar numerals will be utilized to designate similar components, the suffix letter *a* being added to the numerals associated with FIG. 8 to avoid confusion.

The left steering control valve 44a is constructed in the manner shown schematically in FIG. 8 and is connected with the conduits 58a and 62a between the straight tracking valve assembly 54 and the rectifying valve arrangements 104 and 124. In addition, the left steering control valve 44a is connected with conduits 310 and 312 extending from the check valves 106 and 146 (see FIG. 2) to the motor 112 in the actuator assembly 48. When the left steering control valve 44a is in its normal or unactuated position (shown schematically in FIG. 8), the steering control valve does not effect fluid flow through the conduits 58a, 62a, 310 and 312. However, upon actuation of the left steering control valve 44a, the conduits 310 and 312 are cross connected by internal passages 316 and 318 and fluid flow through the conduits 58a and 62a is blocked.

During foward operation of the vehicle 10, actuating the steering control valve 44a ports high pressure fluid from the conduit 310 to the left reverse end portion 152 of the motor 112. In addition, actuating the left steering control valve 44a connects the forward end portion 110 of the motor 112 with drain through conduits 312, 148 and 144. This effects operation of the motor 112 to reduce the output speed of the left hydrostatic transmission 18 and a turning of the vehicle toward the left.

In addition to cross connecting the conduits 310 and 312, actuation of the left steering control valve 44a blocks fluid flow through the conduits 58a and 62a. Blocking fluid flow through the conduits 58a and 62a renders operation of the straight tracking valve assembly 54 ineffective to operate either of the actuator assemblies 48 and 50. During actuation of the left steering control valve 44a and a turning of the vehicle 10 toward the left, the input shaft 84 rotates the inner valve member 66 relative to the outer valve member 70 until the stop pin 268 and surface 276 are in abutting engagement. After this occurs, the clutch 280 slips and the inner and outer valve members 66 and 70 are rotated together by the shaft 84 in the manner previously explained.

Although only the left steering control valve 44d has been shown in FIG. 8, it should be understood that the right steering control 46a is constructed in the same manner. Thus, the right steering control valve 46a has internal passages which cross connect conduits 328 and 330 (FIG. 2) in the same manner as in which the conduits 310 and 312 are cross connected by operation of the left steering control valve 44. Also, actuation of the right steering control valve 46a blocks fluid flow through the conduit 58 and 62 to render the straight tracking control assembly 54 ineffective. Thus, the steering control valves 44a and 46a are connected in series with the conduits 58a and 62a.

In view of the foregoing description, it may be seen that the straight tracking control assembly 54 is operable to equalize the output speeds of a pair of hydrostatic transmission 18 and 20 so that the tracks 14 and 16 are driven at the same speed to move the vehicle 10 along a straight path. The straight tracking control assembly 54 has a housing 78 which defines a valve chamber 194 in which an inner valve member 66 is disposed in a telescopic relationship with an outer valve member 70. The inner and outer valve members 66 and 70 are each rotated by input shafts 74 and 84 which are connected with the motor units 30 and 32 of the hydrostatic transmissions 18 and 20. Each of the input shafts 74 and 84 rotates the associated valve member 66 and 70 at a speed which is directly proportional to the output speed of the associated hydrostatic transmission 18 or 20.

As long as the two hydrostatic transmissions 18 and 20 have the same output speed, the two valve members 66 and 70 are rotated at the same speed. However, if one of the transmissions should speed up or accelerate relative to the other transmission, relative rotation occurs between the inner and outer valve members 66 and 70. This relative rotation between the inner and outer valve members 66 and 70 ports fluid from one of the actuator assemblies 48 and 50 to effect a decrease in the output speed of the faster hydrostatic transmission.

To prevent excessive relative rotation from occurring between the two valve members 66 and 70, the stop pin 268 is moved into engagement with one of the stop surfaces 274 or 276 when a predetermined amount of relative rotation has occurred between the inner and outer valve members 66 and 70. Engagement of the pin 268 with one of the stop surfaces 274 or 276 interconnects the two valve members 66 and 70 so that they rotate together. Since one of the input shafts 74 or 84 is rotating at a higher speed than the other input shaft at this time, slipping occurs at a clutch assembly 280 which is located between the input shaft 74 and the outer valve member 70.

When one of the steering control valves 44 or 46 is actuated to effect a turning of the vehicle, the steering control valve exceeds the correction ability of the control valve assembly to equalize the output speed of the two hydrostatic transmission 18 and 20. This enables one of the tracks 14 or 16 to be driven at a different speed than the other track to effect turning of the vehicle. When turning occurs, the pin 268 is moved into engagement with one of the stop surfaces 274 or 276 to limit relative rotation between the inner and outer valve members 66 and 70. Of course, slipping will occur at the clutch assembly 280 during turning of the vehicle.

Although the straight tracking valve assembly 54 has been shown herein in connection with hydrostatic transmission having fixed displacement motor units 30 and 32, it is contemplated that the straight tracking valve assembly 54 could be associated with hydrostatic transmissions having variable displacement motor units of a construction similar to that shown in the aforementioned Bojas et. al. application Serial No. 248,685 now U.S. Pat. No. 3,795,109. In addition, it should be understood that although the steering control valves 44 and 46 described herein as having a construction similar to that shown in Keith et al. application Ser. No. 158,455, now U.S. Pat No. 3,727,402, it is contemplated that the steering control valves could be constructed so that they would cooperate with the actuator assemblies 48 and 50 in the manner described in application Ser. No. 248,498, filed Apr. 28, 1972, by Harold R. Ward and entitled "Control Valve." Whether the steering control valves 44 and 46 have the construction shown in the Keith et al application or the Ward application, actuation of a steering control exceeds correcting ability of the straight tracking control assembly 54 so that the vehicle 10 can turn. Although the steering valves 44 and 46 are disclosed herein as exceeding the output capability from the straight tracking control assembly 54 to render it ineffective, it is contemplated that the straight tracking control assembly could be rendered ineffective in a manner other than the specific one described herein.

Having described one specific preferred embodiment of the invention, the following is claimed:

1. An apparatus comprising a first hydrostatic transmission for driving one track of a vehicle, a second hydrostatic transmission for driving another track of the vehicle, first and second movable valve members, first means for moving said first valve member at a speed which varies as a function of variations in the speed at which said first hydrostatic transmission drives the one track, second means for moving said second valve member at a speed which varies as a function of variations in the speed at which said second transmission drives the other track, and means for varying the speed at which at least one of said hydrostatic transmissions drives the associated one of said tracks in response to a variation in the speed of movement of one of said valve members relative to the other of said valve members.

2. An apparatus as set forth in claim 1 wherein said means for varying the speed at which at least one of said hydrostatic transmission drives the associated one of said tracks includes motor means for varying the output speed of said one hydrostatic transmission, said apparatus further including steering control means for effecting operation of said motor means to vary the speed at which said one hydrostatic transmission drives the associated one of said tracks.

3. An apparatus as set forth in claim 1 further including clutch means for connecting said first means with said first valve member and for enabling said first valve member to move with said second valve member under the influence of said second drive means.

4. An apparatus as set forth in claim 1 wherein said means for varying the speed at which at least one of said hydrostatic transmission drives the associated one of said tracks includes a double acting hydraulic motor having a first and second operating chamber, conduit means for connecting said first and second operating chambers in fluid communication with at least one of said valve members, and valve means for connecting said one of said valve members in fluid communication with said first chamber during operation of said one hydrostatic transmission in a first direction and for connecting said one of said valve members in fluid communication with said second chamber during operation of said one hydrostatic transmission in a second direction.

5. An apparatus as set forth in claim 4 further including speed control valve means for varying the fluid pressure conducted to said second chamber during operation of said one hydrostatic transmission in said first direction and for varying the fluid pressure conducted to said first chamber during operation of said one hydrostatic transmission in said second direction.

6. An apparatus as set forth in claim 1 further including stop means for limiting relative movement between said first and second valve members to a predetermined range of movement, and steering control means for effecting operation of one of said hydrostatic transmissions at a greater speed than the other hydrostatic transmission to effect a turning of the vehicle, said stop means being effective during turning of the vehicle to limit relative movement between said valve members.

7. An apparatus as set forth in claim 1 further including valve housing means for defining a first chamber, said first valve member being at least partially disposed in said first chamber and including means for defining a second chamber, said second valve member being at least partially disposed in said second chamber, said second valve member including means for at least partially defining a pressure chamber, first conduit means for connecting said pressure chamber in fluid communication with a source of fluid under pressure, and second conduit means for connecting said pressure chamber with said means for varying the speed of at least one of said hydrostatic transmissions, said first and second valve members including means for limiting fluid pressure conducted from said pressure chamber to said second fluid conduit means during operation of said first and second hydrostatic transmissions to drive the tracks of the vehicle at the same speed and for enabling fluid to flow from said pressure chamber to said second fluid conduit means when the speed at which one of the tracks is driven by an associated one of said hydrostatic transmissions is different than the speed at which the other track is driven by the associated one of said hydrostatic transmissions.

8. An apparatus as set forth in claim 7 further including selectively actuatable control means for effecting operation of one of said hydrostatic transmissions to drive one of the tracks at a slower speed than the other track to effect a turning of the vehicle, said control means including means for limiting fluid under pressure during actuation of said control means.

9. An apparatus as set forth in claim 1 further including stop means for preventing relative movement in one direction between said first and second valve members after said first and second valve members have moved through a predetermined distance in the one direction.

10. An apparatus as set forth in claim 9 further including clutch means interconnecting said first means and first valve member for enabling said first valve member to move relative to said first means upon operation of said stop means to prevent relative movement between said valve members.

11. An apparatus as set forth in claim 9 wherein said stop means includes means for operatively interconnecting said first and second valve members after movement of said first and second valve members through the predetermined distance in the one direction.

12. An apparatus for controlling the operation of an actuator assembly which is operable to vary the output speed of an associated one of a pair of hydrostatic transmissions, said apparatus comprising a housing defining a valve chamber, inlet means for connecting said valve chamber in fluid communication with a source of fluid under pressure, outlet means for connecting said valve chamber in fluid communication with the actuator assembly, a first valve member at least partially disposed in said housing, first rotatable input means for rotating said first valve member at a speed which varies as a function of variations in the operating speed of an associated one of the pair of hydrostatic transmissions, a second valve member at least partially disposed in said valve chamber, second rotatable input means for rotating said second valve member at a speed which varies as a function of variations in the operating speed of the other one of the pair of hydrostatic transmissions, said first and second valve members including means for limiting fluid communication between said inlet and outlet means during rotation of said first and second valve members at the same speed by said first and second input means and for connecting said inlet and outlet means in fluid communication upon relative rotation between said first and second valve members, and clutch means for interconnecting one of said valve members and one of said input means and for enabling said one valve member to rotate with the other valve member relative to said one input means during continued operation of the hydrostatic transmissions at different output speeds.

13. An apparatus as set forth in claim 12 further including means for interconnecting said first and second valve members for rotation together relative to said housing during continued operation of the hydrostatic transmissions at different speeds.

14. An apparatus as set forth in claim 12 wherein said clutch means includes a first circular clutch surface connected with said one of said valve members, a second circular clutch surface connected with said one input means and spring means for urging said first and second clutch surfaces into pressure engagement.

15. An apparatus for controlling the operation of an actuator assembly which is operable to vary the output speed of an associated one of a pair of hydrostatic transmissions said apparatus comprising a housing defining a valve chamber, inlet means for connecting said valve chamber in fluid communication with a source of fluid under pressure, outlet means for connecting said valve chamber in fluid communication with the actuator assembly, a first valve member at least partially disposed in said housing, first rotatable input means for rotating said first valve member at a speed which varies as a function of variations in the operating speed of an associated one of the pair of hydrostatic transmissions, a second valve member at least partially disposed in said valve chamber, second rotatable input means for rotating said second valve member at a speed which varies as a function of variations in the operating speed of the other one of the pair of hydrostatic transmissions, said first and second valve members including means for limiting fluid communication between said inlet and outlet means during rotation of said first and second valve members at the same speed by said first and second input means and for connecting said inlet and outlet means in fluid communication upon relative rotation between said first and second valve members, and stop means for limiting the extent of relative rotation between said first and second valve members.

16. An apparatus as set forth in claim 15 wherein said stop means includes a stop element connected with one of said valve members, first stop surface means connected with the other of said valve members for engaging said stop element to limit relative rotation between said first and second valve members in a first direction, and second stop surface means connected with said other valve member for engaging said stop element to limit relative rotation between said first and second valve members in a second direction.

17. An apparatus as set forth in claim 16 further including clutch means for interconnecting one of said valve member and one of said input means and for enabling the one valve member to rotate relative to the one input means upon engagement of said stop element with one of said stop surface means.

18. An apparatus comprising a first variable displacement hydrostatic transmission for driving one track of a vehicle, a second variable displacement hydrostatic transmission for driving another track of a vehicle, first fluid motor means for varying the displacement of said first hydrostatic transmission, second fluid motor means for varying the displacement of said second hydrostatic transmission, steering valve means connected in fluid communication with said first and second fluid motor means for effecting operation of said first fluid motor means and a turning of the vehicle in a first direction and for effecting operation of said second fluid motor means and a turning of the vehicle in a second direction, straight tracking control means for effecting operation of said first fluid motor means upon a change in the speed at which the one track of the vehicle is driven relative to the speed at which the other track of the vehicle is driven and for effecting operation of said second fluid motor means upon a change in the speed at which the other track of the vehicle is driven relative to the speed at which the one track of the vehicle is driven, and means for rendering said straight tracking control means ineffective to effect operation of said first and second fluid motor means upon operation of said steering valve means.

19. An apparatus as set forth in claim 19 further including first conduit means for conducting fluid under pressure to said straight tracking control means, second conduit means for conducting fluid under pressure from said straight tracking control means to said first fluid motor means, and third conduit means for conducting fluid under pressure from said straight tracking control means to said second fluid motor means.

20. An apparatus as set forth in claim 19 wherein said means for rendering said straight tracking control means ineffective includes means for limiting fluid flow through at least one of said conduit means upon operation of said steering control means.

21. An apparatus as set forth in claim 19 wherein said means for rendering said straight tracking control means ineffective includes means for limiting fluid flow through said second and third conduit means upon operation of said steering control valve means.

22. An apparatus as set forth in claim 19 wherein said steering valve means includes a first manually actuated valve means for porting fluid under pressure to said first fluid motor means to effect a turning of the vehicle in the first direction and a second manually actuatable valve means for porting fluid under pressure to said second fluid motor means to effect a turning of the vehicle in the second direction, said means for rendering said straight tracking control means ineffective including means for limiting fluid flow through at least one of said conduit means upon operation of said first manually actuatable valve means for and for fluid flow through at least one of said conduit means upon operation of said second manually actuatable valve means.

23. An apparatus as set forth in claim 19 wherein said straight tracking control means includes straight tracking valve means for porting fluid under pressure from said first conduit means to said second conduit means upon a change in the speed at which the one track of the vehicle is driven relative to the speed at which the other track of the vehicle is driven and for porting fluid under pressure from said first conduit means to said third conduit means upon a change in the speed at which the other track of the vehicle is driven relative to the speed at which the one track of the vehicle is driven.

24. An apparatus as set forth in claim 23 wherein said straight tracking valve means includes first and second valve members, said straight tracking control means including first input means for moving said first valve member at a speed which varies as a function of variations in the speed at which said first hydrostatic transmission drives the one track and second input means for moving said second valve member at a speed which varies as a function of variations in the speed at which said second hydrostatic transmission drives the other track.

25. An apparatus as set forth in claim 24 wherein said straight tracking control means further includes clutch means for interconnecting said first input means and said first valve member and for enabling relative movement to occur between said first valve member and said first input means during continued operation of said hydrostatic transmissions at different output speeds.

26. An apparatus as set forth in claim 25 further including stop means for limiting the extent of relative movement between said first and second valve members and for effecting operation of said clutch means to enable relative movement to occur between said first valve member and said first input means.

27. An apparatus comprising a first variable displacement hydrostatic transmission for driving one track of a vehicle, a second variable displacement hydrostatic transmission for driving another track of a vehicle, first fluid motor means for varying the displacement of said first hydrostatic transmission, second fluid motor means for varying the displacement of said second hydrostatic transmission, first steering valve means connected with said first fluid motor means and operable from an unactuated condition to an actuated condition to effect operation of said first fluid motor means and a turning of the vehicle in a first direction, second steering valve means connected with said second fluid motor means and operable from an unactuated condition to an actuated condition to effect operation of said second fluid motor means and a turning of the vehicle in a second direction, and straight tracking control means for effecting operation of said first and second fluid motor means to maintain the speeds at which the tracks are driven substantially equal during straight forward movement of the vehicle, said straight tracking control means including straight tracking valve means operable from an initial condition to a first actuated condition to effect operation of said first fluid motor means to vary the speed at which the one track of the vehicle is driven relative to the speed at which the other track of the vehicle is driven, said straight tracking valve means being operable from said initial condition to a second actuated condition to effect operation of said second fluid motor means to vary the speed at which the other track of the vehicle is driven relative to the speed at which the one track of the vehicle is driven, and means for effecting operation of said straight tracking valve means from said initial condition to said first actuated condition in response to a variation in the speed at which the one track of the vehicle is driven relative to the speed at which the other track of the vehicle is driven and for effecting operation of said straight tracking valve means from said initial condition to said second actuated condition in response to a variation in the speed at which the other track of the vehicle is driven relative to the speed at which the one track of the vehicle is driven.

28. An apparatus as set forth in claim 27 further including means for rendering said straight tracking valve means ineffective to effect operation of said first fluid motor means upon operation of said first steering valve means and for rendering said straight tracking valve mans ineffective to effect operation of said second fluid motor means upon operation of said second steering valve means.

29. An apparatus as set forth in claim 27 wherein said means for effecting operation of said straight tracking valve means includes a first input member which rotates at a speed which varies with variations in the speed at which the one track of the vehicle is driven, a second input member which rotates at a speed which varies with variations in the speed at which the other track of the vehicle is driven, and means for effecting operation of said straight tracking valve means from said initial condition to said first actuated condition upon rotation of said first input member at a faster speed than said second input member and for effecting operation of said straight tracking valve means from said initial condition to said second actuated condition upon rotation of said second input member at a faster speed than said first input member.

30. An apparatus comprising a first variable displacement hydrostatic transmission for driving one track of a vehicle, a second variable displacement hydrostatic transmission for driving another track of a vehicle, first fluid motor means for varying the displacement of said first hydrostatic transmission, second fluid motor means for varying the displacement of said second hydrostatic transmission, straight tracking control means for effecting operation of said first and second fluid motor means to maintain the speeds at which the tracks are driven substantially equal during straight forward movement of the vehicle, said straight tracking control means including straight tracking valve means operable from an initial condition to a first actuated condition to port fluid pressure and effect operation of said first fluid motor means to vary the speed at which the one track of the vehicle is driven relative to the speed at which the other track of the vehicle is driven, said straight tracking valve means being operable from said initial condition to a second actuated condition to port fluid pressure and effect operation of said second fluid motor means to vary the speed at which the other track of the vehicle is drive relative to the speed at which the one track of the vehicle is driven, and means for effecting operation of said straight tracking valve means from said initial condition to said first actuated condition in response to a variation in the speed at which the one track of the vehicle is driven relative to the speed at which the other track of the vehicle is driven and for effecting operation of said straight tracking valve means from said initial condition to said second actuated condition in response to a variation in the speed at which the other track of the vehicle is driven relative to the speed at which the one track of the vehicle is driven, first steering valve means operable from an unactuated condition to an actuated condition to port fluid pressure to render said straight tracking control means ineffective and to effect operation of said first fluid motor means and a turning of the vehicle in a first direction, and second steering valve means operable from an unactuated condition to an actuated condition to port fluid pressure to render said straight tracking control means ineffective and to effect operation of said second fluid motor means and a turning of the vehicle in a second direction.

* * * * *

UNITED STATES PATENT OFFICE
CERTIFICATE OF CORRECTION

Patent No. 3,862,668    Dated January 28, 1975

Inventor(s) Harold R. Ward

It is certified that error appears in the above-identified patent and that said Letters Patent are hereby corrected as shown below:

Col. 11, line 50:   Pat. No. 3,727,4002 should properly read "3,727,402".

Col. 18, claim 22, line 27:   After "means" delete "for" and after "and for" insert "limiting".

Col. 20, claim 30, line 32:   "drive" should properly read "driven".

Signed and sealed this 8th day of April 1975.

(SEAL)
Attest:

RUTH C. MASON
Attesting Officer

C. MARSHALL DANN
Commissioner of Patents
and Trademarks